United States Patent
Zhang et al.

(10) Patent No.: US 7,730,514 B1
(45) Date of Patent: Jun. 1, 2010

(54) METHOD AND SYSTEM FOR PROVIDING A HOME CABLE NETWORK

(75) Inventors: Weimin Zhang, San Jose, CA (US); Thomas Ayers, San Jose, CA (US)

(73) Assignee: BroadLogic Network Technologies, San Jose, CA (US)

( * ) Notice: Subject to any disclaimer, the term of this patent is extended or adjusted under 35 U.S.C. 154(b) by 994 days.

(21) Appl. No.: 10/870,709

(22) Filed: Jun. 16, 2004

Related U.S. Application Data (60) Provisional application No. 60/479,018, filed on Jun. 16, 2003.

(51) Int. Cl.
*H04N 7/173* (2006.01)
*H04N 7/20* (2006.01)

(52) U.S. Cl. .................. 725/119; 725/120; 725/131; 725/71; 725/133

(58) Field of Classification Search .................. 725/119
See application file for complete search history.

(56) References Cited

U.S. PATENT DOCUMENTS

| | | | |
|---|---|---|---|
| 5,594,726 A * | 1/1997 | Thompson et al. | 370/485 |
| 5,638,112 A * | 6/1997 | Bestler et al. | 725/151 |
| 5,898,693 A * | 4/1999 | Vecchi et al. | 370/446 |
| 5,983,068 A * | 11/1999 | Tomich et al. | 725/32 |
| 6,622,305 B1 * | 9/2003 | Willard | 725/101 |
| 6,757,029 B2 * | 6/2004 | Kurihara | 348/731 |
| 6,961,956 B2 * | 11/2005 | Bontempi | 725/151 |
| 6,970,564 B1 * | 11/2005 | Kubota et al. | 380/210 |
| 7,130,576 B1 * | 10/2006 | Gurantz et al. | 455/3.02 |
| 7,134,131 B1 * | 11/2006 | Hendricks et al. | 725/31 |
| 7,263,713 B2 * | 8/2007 | Oishi et al. | 725/117 |
| 7,313,811 B1 * | 12/2007 | Sheppard et al. | 725/143 |
| 7,538,825 B2 * | 5/2009 | Kasamatsu et al. | 348/725 |
| 2002/0030740 A1 * | 3/2002 | Arazi et al. | 348/143 |
| 2002/0059651 A1 * | 5/2002 | Hirata et al. | 725/153 |
| 2003/0189666 A1 * | 10/2003 | Dabell et al. | 348/389.1 |
| 2004/0034876 A1 * | 2/2004 | Schilling | 725/144 |
| 2004/0177381 A1 * | 9/2004 | Kliger et al. | 725/131 |
| 2004/0217891 A1 * | 11/2004 | Dhalla et al. | 341/144 |

* cited by examiner

*Primary Examiner*—Brian T Pendleton
*Assistant Examiner*—Pinkal Chokshi
(74) *Attorney, Agent, or Firm*—Townsend and Townsend and Crew LLP (57) ABSTRACT

A system for converting digital signals in a cable network is provided. A cable head end provides a plurality of digital signals. The plurality of digital signals are grouped into a first portion and a second portion, the first portion being in a first frequency band and the second portion being in a second frequency band. The system includes a digital channel remapping module configured to select one or more digital signals from the first portion and remap the selected one or more digital signals into a first plurality of analog signals and a digital-to-analog translator configured to convert the digital signals in the second portion to a second plurality of analog signals. The first and second plurality of analog signals are combined and delivered to at least one analog device. Some or all of the second plurality of analog signals are within the first frequency band.

45 Claims, 4 Drawing Sheets

METHOD AND SYSTEM FOR PROVIDING A HOME CABLE NETWORK

CROSS REFERENCES TO RELATED APPLICATION(S)

The present application claims the benefit of priority under 35 U.S.C. §119 from U.S. Provisional Patent Application Ser. No. 60/479,018, filed Jun. 16, 2003, entitled "METHOD AND SYSTEM FOR PROVIDING AN HOME CABLE NETWORK", by WeiMin Zhang, the disclosure of which is hereby incorporated by reference in its entirety for all purposes as if set forth in full herein.

BACKGROUND OF THE INVENTION

The present invention generally relates to an home network architecture, and more specifically, to an home network architecture that is capable of handling analog and digital signals in a more efficient manner.

Figure 1:
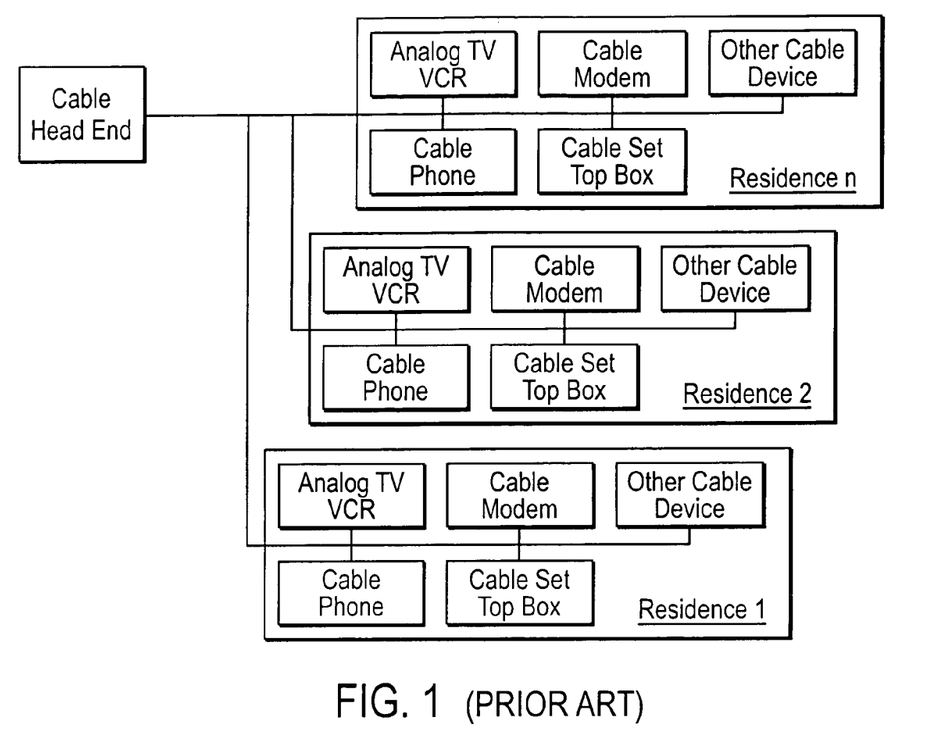
FIG. 1 is a simplified block diagram illustrating a traditional cable network architecture.

A traditional cable network is shown in FIG. 1. As shown in FIG. 1, a cable head end provides signals to a number of residences equipped to receive and consume such signals. Each residence may have one or more pieces of equipment that are configured to receive signals from the cable head end, including for example, an analog television, a cable phone, a cable modem, a cable set-top box and other cable devices, etc.

In a traditional cable network, both analog and digital signals can be transmitted. Typically, bandwidth delivered by the cable network is up to 860 MHz. Very often, lower frequency band below 52 MHz is utilized for digital upstream link; upper frequency band (from 52 MHz to 860 MHz) is utilized for downstream content delivery and is divided based on the nature of the signals, more specifically, analog and digital. Generally, a cable plant today has up to 80 analog channels, which occupies up to 480 MHz of total band, leaving about as low as 320 MHz band for all the digital services.

Figure 2:
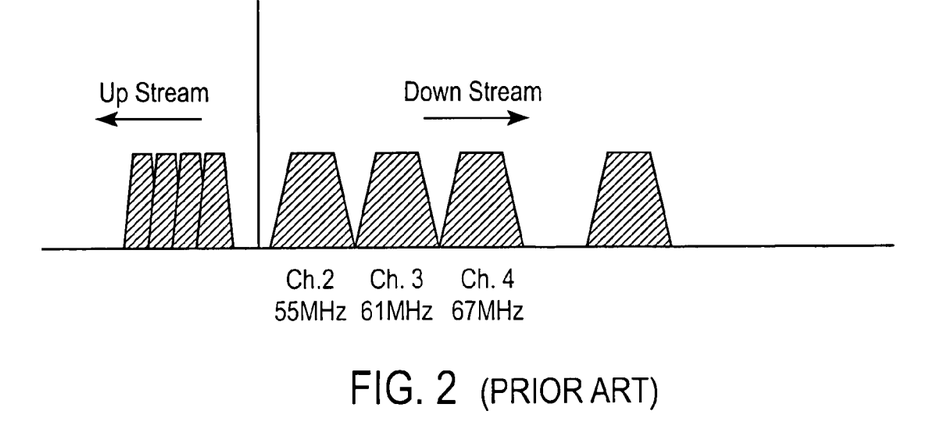
FIG. 2 is a diagram illustrating the upstream frequency plan of a conventional cable plant.

Analog channels typically occupy the frequency band beginning at 55 MHz. For example, the traditional analog television channels 2, 3 and 4 occupy the frequency band at 55 MHz, 61 MHz and 67 MHz respectively. As a result, upstream frequency is limited to 52 MHz. In order to provide users with additional upstream bandwidth, a node split is required where fewer users can share the same 52 MHz bandwidth. FIG. 2 is a diagram illustrating the upstream frequency plan of a conventional cable plant.

The use of analog channels is relatively inefficient. Each RF (radio frequency) channel is configured to accommodate one analog program. On the other hand, multiple (e.g., ten) digital programs can be accommodated by each RF channel. Therefore, with the constantly increasing demand for bandwidth, use of RF channels for analog programs has become wasteful and inefficient.

Furthermore, in a traditional cable network that provides digital signals, a specialized digital set top box is needed for each device that is to receive the digital signals. For example, if there are three televisions in the residence and if each of the televisions is to receive the digital signals, then three digital set top boxes would be needed. Since each digital set top box is quite expensive, the relatively high cost has impeded the growth and popularity of digital cable subscriptions. Moreover, those digital set top boxes very often are not compatible with the functions of existing analog devices. For example, the pre-set recording function of a current analog video cassette recorder does not work with any existing digital set top box.

In addition, due to certain practical constraints, subscribers to traditional analog cable networks and digital cable networks are offered different types of services. Subscribers to digital cable networks are often offered premium services, such as, premium channels and pay-per-view programs, etc. Such premium services are usually not offered to subscribers to analog cable networks.

Hence, it would be desirable to provide an home network architecture that is capable of providing analog and digital signals in a more efficient manner.

BRIEF SUMMARY OF THE INVENTION

A system for processing digital signals from a cable head end is provided. The digital signals are grouped into a first portion and a second portion, the first portion being in a first frequency band and the second portion being in a second frequency band. The digital signals in the first portion represent digital contents to be used by the one or more digital devices and the digital signals in the second portion represent analog contents to be used by at least one analog device. In one embodiment, the system comprises a digital channel remapping module configured to select one or more digital signals from the first portion and remap the selected one or more digital signals into a first plurality of analog signals and a digital-to-analog translator configured to convert the digital signals in the second portion to a second plurality of analog signals. The first and second plurality of analog signals are combined and delivered to at least one analog device. Some or all of the second plurality of analog signals are within the first frequency band. Optionally, the system further comprises a digital converter configured to convert the digital signals in the first portion for use by one or more digital devices.

In one embodiment, the digital-to-analog translator comprises: a wideband receiver configured to receive the digital signals in the second portion and generate an output; a decoder configured to decode the output from the wideband receiver and generate an output; an encoder configured to encode the output from the decoder and generate an output; a multiplexer configured to multiplex the output from the encoder and generate an output; a digital-to-analog converter configured to convert the output from the multiplexer into an analog output; and a frequency converter configured to adjust the analog output from the digital-to-analog converter to a desired frequency range. Optionally, the digital-to-analog translator further includes a conditional access module configured to receive the output from the wideband receiver and control access to the digital signals in the second portion.

In one embodiment, the digital channel remapping module further comprises: a frequency-down converter configured to convert the digital signals in the first portion and generate an output; a plurality of analog-to-digital converters configured to receive the output from the frequency converter and generate an output; a channel demultiplexer configured to receive and demultiplex the output from the plurality of analog-to-digital converters and generate an output; a channel remapping multiplexer configured to multiplex the output from the channel demultiplexer and generate an output; a digital-to-analog converter configured to convert the output from the channel remapping multiplexer to an analog signal; and a frequency-up converter configured to adjust the analog signal from the digital-to-analog converter to a desired frequency range.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

Figure 3:
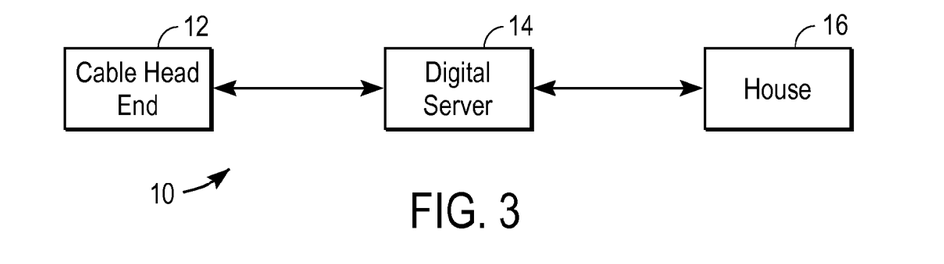
FIG. 3 is a simplified block diagram illustrating a system in accordance with an exemplary embodiment of the present invention.

The present invention in the form of one or more exemplary embodiments will now be described. FIG. 3 is a simplified block diagram illustrating a system 10 in accordance with an exemplary embodiment of the present invention. As shown in FIG. 3, the system 10 includes a cable head end 12, a digital gateway or server 14 and a house 16 equipped to receive signals from the digital server 14. As will be further described below, the digital server 14 receives digital signals from the cable head end 12 and converts such signals accordingly into both analog and digital signals. These converted signals are then provided to the house 16 for use by respective devices located therein. Depending on the nature of the devices, the analog and digital signals can then be used accordingly. In addition, the cable head end 12 is able to communicate with the digital server 14 so as to control how the digital server 14 should process the incoming signals from the cable head end 12. Control by the cable head end 12 can be provided via conditional access. For example, incoming signals or portions thereof from the cable head end 12 can only be unlocked by the digital server 14 having the appropriate security key. The security key can be provided, for example, in the form of a smartcard or other similar devices. Alternatively, control by the cable head end 12 can also be provided via a two-way communication link with the digital server 14.

Figure 4:
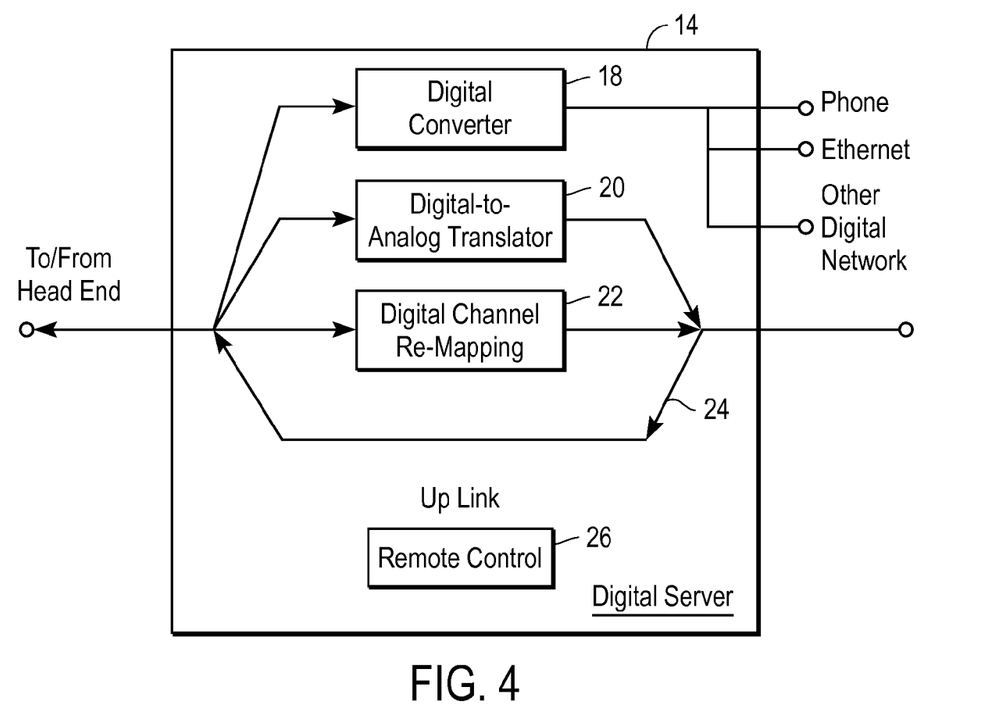
FIG. 4 is a simplified block diagram illustrating an exemplary embodiment of a digital server in accordance with the present invention.

FIG. 4 is a simplified block diagram illustrating an exemplary embodiment of the digital server 14. As shown in FIG. 4, the digital server 14 includes a number of components including a digital converter 18, a digital-to-analog translator 20 and a digital channel remapping module 22. The incoming digital signals from the cable head end 12 are multiplexed and forwarded to the various components of the digital server 14 for processing as will be further described below. The digital server 14 also includes an uplink 24 which allows signals received from devices located in the house 16 to be passed upstream to the cable head end 12. The digital server 14 further includes a remote control 26 which allows a user to control and communicate with the digital sever 14 using a remote control device.

Figure 5:
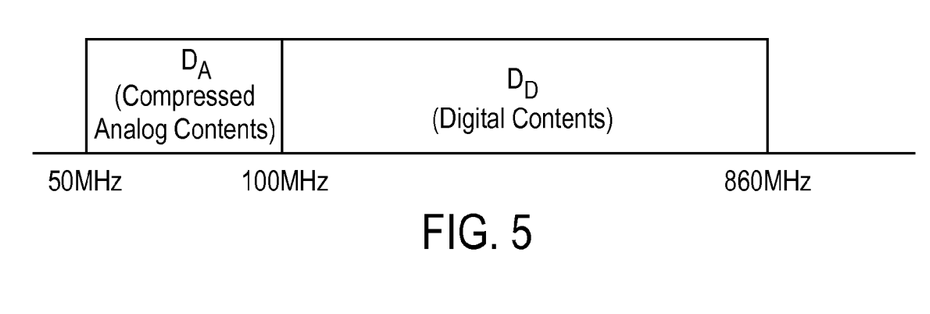
FIG. 5 is a simplified schematic diagram illustrating an exemplary bandwidth allocation of signals coming from a cable head end in accordance with the present invention.

As mentioned above, the incoming signals from the cable head end 12 are digital. However, the available bandwidth of the incoming signals is divided into two portions, namely, a first portion that carries digital contents or channels and a second portion that carries digital representation of analog contents or channels. The digital contents from the first portion may fall into a number of categories and include, for example, premium digital channels, video-on-demand programs, and Internet access, etc. The digital representation in the second portion can be viewed as a compressed version of the analog contents. FIG. 5 is a simplified schematic diagram illustrating allocation of the available bandwidth of the incoming signals from the cable head end 12. When the present invention is compared with a traditional cable network, a larger portion of the available bandwidth is allocated to digital contents and a smaller portion of the available bandwidth is allocated to digital representation of analog contents. The bandwidth allocated to the digital representation can be, for example, 50 MHz-100 MHz. The respective sizes of the two portions may vary depending on a number of factors including, for example, the specific design and/or constraints of an application. Based on the disclosure and teachings provided herein, a person of ordinary skill in the art will understand how to allocate the two portions within the available bandwidth.

As noted above, the digital signals coming from the cable head end 12 have two portions, the first portion representing digital contents and the second portion representing compressed analog contents. The two portions are handled and processed differently by the various components of the digital server 14, as will be further described below.

As mentioned above, the incoming signals (i.e., the first and second portions) from the cable head end 12 are multiplexed and delivered to the respective components for processing. The digital converter 18 receives the first portion and converts the digital contents for use by other digital devices, such as, cable phone, an Ethernet network and other digital network, etc. The digital converter 18 is able to convert different digital standards, such as QPSK, QAM, OFDM, ATSC, etc., into the same modulation scheme.

Figure 6:
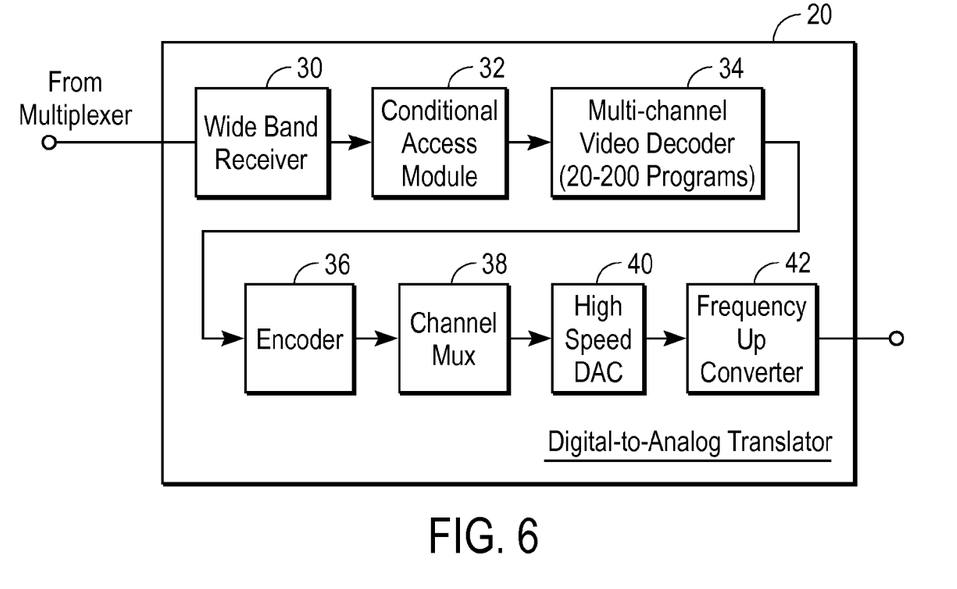
FIG. 6 is a simplified block diagram illustrating an exemplary embodiment of a digital-to-analog translator in accordance with the present invention.

The digital-to-analog translator 20 is used to convert the second portion to analog signals for use by analog devices, such as, an analog television. Since the second portion represents compressed analog contents, the function of the digital-to-analog translator 20 is to decompress the second portion and derive the corresponding analog contents. In other words, the second portion is expanded to derive the corresponding analog contents. Since the second portion is expanded, additional bandwidth is needed. As will be further described below, the needed additional bandwidth is obtained from remapping the first portion. FIG. 6 is a simplified block diagram illustrating an exemplary embodiment of the digital-to-analog translator 20 in accordance with the present invention.

Referring to FIG. 6, the digital-to-analog translator 20 is made up of a number of components including a wideband receiver 30, a decoder 34, an encoder 36, a multiplexer 38, a digital-to-analog converter 40 and a frequency converter 42. Optionally, the digital-to-analog translator 20 also includes a conditional access module 32. These components are arranged in a sequential configuration to translate the second portion into corresponding analog contents. The wideband receiver 30 receives the second portion. Based on the disclosure and teachings provided herein, a person of ordinary skill in the art will know of other receivers that can be used in accordance with the present invention.

The conditional access module 32 determines whether the translator 20 is authorized to process the signals or portions thereof. For example, the signals may only be unlocked by the conditional access module 32 if an appropriate security key is applied. The conditional access module 32 controls access to the signals based on a variety of information including, for example, subscription information, such as, whether service is for premium service or basic service. Such information can be provided to the conditional access module 32 in a number of ways. For example, the information can be uploaded to the conditional access module 32 via a wireline connection, such as, a telephone line; alternatively, the information can be stored in a remote control device, such as, a RF (radio frequency) or infrared remote control, for use in cooperation with the digital server 14 and transmitted from the remote control device to the conditional access module 32.

The decoder 34 decodes the signals received from the conditional access module 32 and outputs the decoded signals to the encoder 36. The encoder 36 encodes the decoded signals from the decoder 34 so as to render such signals into a format, such as NTSC and PAL, which is suitable for use by other analog devices, such as, an analog television.

Output from the encoder 36 are then forwarded to the multiplexer 38 for delivery to the digital-to-analog converter 40. Output from the digital-to-analog converter 40 is then forwarded to the frequency converter 42 which adjusts the analog signals from the digital-to-analog converter 40 to a desired frequency. The desired frequency is determined in conjunction with the digital channel remapping module 22, as will be further described below. The adjusted analog signals are then provided to various analog devices installed in the house 16. The various analog devices include, for example, one or more analog televisions.

Figure 7:
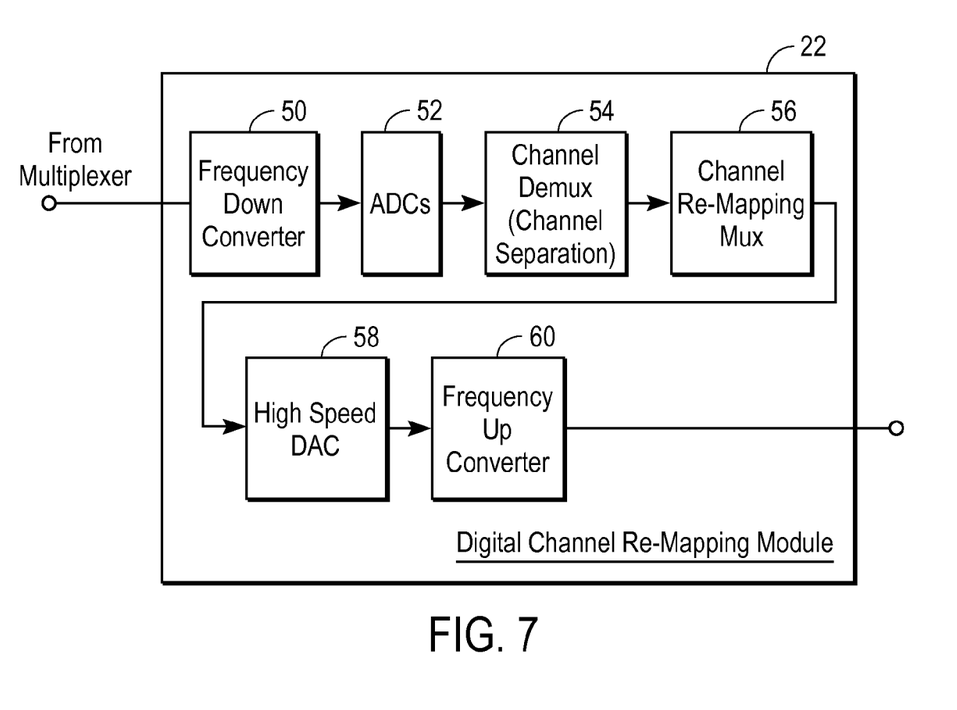
FIG. 7 is a simplified block diagram illustrating an exemplary embodiment of a digital channel remapping module in accordance with the present invention.

FIG. 7 is a simplified block diagram illustrating an exemplary embodiment of the digital channel remapping module 22 in accordance with the present invention. The digital channel remapping module 22 is used to remap the first portion so that only selected digital contents are delivered to the appropriate devices. In other words, some of the signals in the first portions are removed. In a typical situation, a subscriber does not need the entire contents from the first portion. The subscriber may subscribe to only selected digital contents, such as, a few premium channels, a video-on-demand program or Internet access, etc. Hence, there is no need to deliver all the contents from the first portion. By delivering only selected digital contents, additional bandwidth from the first portion can be freed up to allow the second portion to be expanded as described above. Based on the disclosure and teachings provided herein, a person of ordinary skill in the art will appreciate how to allocate appropriate percentage of the first portion for use by the expanded second portion.

Referring to FIG. 7, the remapping module 22 is made up of a number components including a frequency-down converter 50, a number of analog-to-digital converters 52, a channel demultiplexer 54, a channel remapping multiplexer 56, a digital-to-analog converter 58 and a frequency-up converter 60. These components are arranged in a sequential configuration to remap the first portion such that the corresponding analog programs from the second portion can be delivered in desired frequency ranges that were previously occupied by some of the now removed signals in the first portion. Furthermore, by remapping the first portion and allowing the corresponding analog program from the second portion to be delivered in desired frequency ranges, upstream bandwidth for the uplink 24 can be increased notwithstanding the analog channel limitations.

The first portion from the cable head end 12 is provided to the frequency-down converter 50 for downward frequency adjustment. Output from the frequency-down converter 50 is then forwarded to the analog-to-digital converters 52. Output from the analog-to-digital converters 52 are then received by the channel demultiplexer 54 which demultiplexes the signals so as to achieve channel separation. Output from the channel demultiplexer 54 is then fed to the channel remapping multiplexer 56 which multiplexes the signals such that the channels are remapped. Output from the channel remapping multiplexer 56 is then forwarded to the digital-to-analog converter 58 for conversion. Output from the digital-to-analog converter 58 is then provided to the frequency-up converter 60 for upward frequency adjustment. The frequency adjustment is performed in coordination with the digital-to-analog translator 20 to ensure that the analog signals generated by the digital-to-analog translator 20 can be combined with the output of the digital channel remapping module 22. Finally, the combined signals from the digital-to-analog translator 20 and the digital channel remapping module 22 are provided to various analog and digital devices for consumption respectively.

In an alternative embodiment, the incoming signals from the cable head end 12 represent all digital contents. Using the digital server 14 as described above, some of the digital contents can be removed from the incoming signals and other digital contents can be converted into an analog format using bandwidth that has been vacated by the removed digital contents. Since some of the digital contents are now in an analog format, they can be viewed by a user using an analog device without the need for a digital set top box.

The present invention offers a number of benefits and/or advantages. For example, since the incoming signals from the cable head end 12 are digital in nature, the present invention can be used to convert high-definition (HD) or standard digital television signals into analog television signals for consumption in the entire house. In addition, the digital server 14 is able to exercise more precise control in determining which portions of the incoming signals are to be delivered to the house 16. As a result, when digital servers 14 are deployed with different houses 16, the houses 16 are able to receive different contents depending on their respective subscriptions. Furthermore, analog programs can now be selectively delivered to analog devices. In one exemplary application, analog device users can selectively subscribe to different analog programs, such as, pay-per-view programs, premium channels (such as HBO) or other types of services.

In addition, the converted analog and digital signals from the digital server 14 can be combined for transmission over a single medium, such as a cable, and delivered respectively to a combination of devices within the house 16. For example, the analog signals can be provided to one or more analog devices, such as, analog televisions, in different rooms; and the digital signals can be provided to a digital device in another room. As a result, every room in the house that has a device, whether analog or digital, is now able to receive premium-type programming such as on-demand or pay-per-view channels. Based on the disclosure and teachings provided herein, a person of ordinary skill in the art will know of other ways and/or methods to deploy the present invention other applications.

Figure 8:
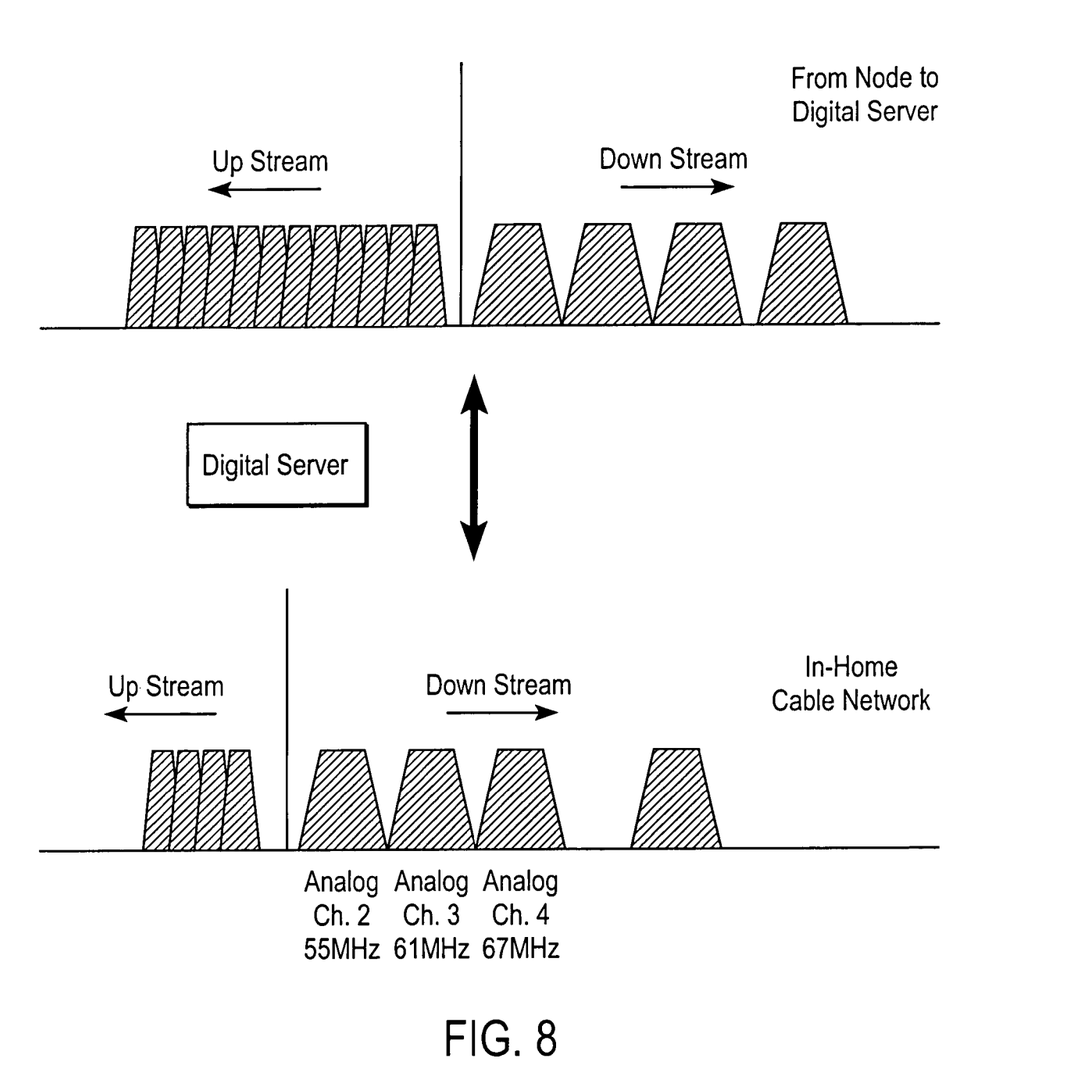
FIG. 8 is a diagram illustrating the upstream frequency plan of an exemplary embodiment of the present invention.

Moreover, the present invention provides for effective upstream bandwidth increases without any node splitting and regard to analog channel limitation. FIG. 8 is a diagram illustrating an upstream frequency plan of an exemplary embodiment of the present invention.

In one embodiment, the digital server 14 is built on an integrated circuit chip. While the digital server 14 is described above in terms of different modules, it should be understood that the components and functionality of the digital server 14 can be implemented in other manners, integrated, modular or otherwise. Based on the disclosure and teachings provided herein, a person of ordinary skill in the art will know of other ways and/or methods to implement the present invention.

While the present invention is described above in terms of a cable head end 12, it should be understood that the present invention can be deployed and used in other systems that transmit digital signals. Based on the disclosure and teachings provided herein, a person of ordinary skill in the art will know of other ways and/or methods to deploy the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A system for processing a plurality of digital signals from a cable head end, the plurality of digital signals being grouped into a first portion and a second portion, the first portion being in a first frequency band and the second portion being in a second frequency band, the system comprising:
    a digital channel remapping module configured to remove one or more digital signals from the first portion and remap one or more remaining digital signals in the first portion onto a different region of the first frequency band, thereby freeing up a part of the first frequency band; and
    a digital-to-analog translator configured to convert at least some of the digital signals in the second portion to a plurality of analog format signals suitable for use by analog devices;
    wherein remaining digital signals in the first portion and the plurality of analog format signals are combined and delivered to at least one analog device; and
    wherein some or all of the plurality of analog format signals are generated to fall within the first frequency band.

2. The system of claim 1 further comprising:
    a digital converter configured to convert the digital signals in the first portion for use by one or more digital devices.

3. The system of claim 1 wherein:
    the digital signals in the first portion represent digital contents to be used by one or more digital devices; and
    the digital signals in the second portion represent analog contents to be used by the at least one analog device.

4. The system of claim 1 wherein the one or more digital devices include a cable phone and a digital network.

5. The system of claim 1 wherein the at least one analog device includes an analog television.

6. The system of claim 1 wherein the plurality of digital signals include high-definition television signals.

7. The system of claim 1 wherein the digital-to-analog translator comprises:
    a wideband receiver configured to receive the digital signals in the second portion and generate an output;
    a decoder configured to decode the output from the wideband receiver and generate an output;
    an encoder configured to encode the output from the decoder and generate an output;
    a multiplexer configured to multiplex the output from the encoder and generate an output;
    a digital-to-analog converter configured to convert the output from the multiplexer into an analog output; and
    a frequency converter configured to adjust the analog output from the digital-to-analog converter to a desired frequency range.

8. The system of claim 7 wherein the digital-to-analog translator includes:
    a conditional access module configured to receive the output from the wideband receiver and control access to the digital signals in the second portion.

9. The system of claim 8 wherein the conditional access module is further configured to direct one or more digital signals in the second portion for delivery to the decoder for processing.

10. The system of claim 9 wherein the one or more digital signals in the second portion that are directed for delivery to the decoder are determined based on one or more criteria.

11. The system of claim 10 wherein the one or more criteria include a security key.

12. The system of claim 10 wherein the one or more criteria include subscription information.

13. The system of claim 1 wherein the digital channel remapping module comprises:
    a frequency-down converter configured to convert the digital signals in the first portion and generate an output;
    a plurality of analog-to-digital converters configured to receive the output from the frequency converter and generate an output;
    a channel demultiplexer configured to receive and demultiplex the output from the plurality of analog-to-digital converters and generate an output;
    a channel remapping multiplexer configured to multiplex the output from the channel demultiplexer and generate an output;
    a digital-to-analog converter configured to convert the output from the channel remapping multiplexer to an analog signal; and
    a frequency-up converter configured to adjust the analog signal from the digital-to-analog converter to a desired frequency range.

14. An integrated circuit incorporating the system as recited in claim 1.

15. A digital server for processing a plurality of digital signals from a digital source for use by a plurality of analog devices located in a home, the plurality of digital signals being grouped into a first portion and a second portion, the first portion being in a first frequency band and the second portion being in a second frequency band, the digital server comprising:
    a digital channel remapping module configured to remove one or more digital signals from the first portion and remap one or more remaining digital signals in the first portion onto a different region of the first frequency band, thereby freeing up a part of the first frequency band; and
    a digital-to-analog translator configured to convert at least some of the digital signals in the second portion to a plurality of analog format signals suitable for use by analog devices;
    wherein remaining digital signals in the first portion and the plurality of analog format signals are combined and delivered to at least one analog device; and
    wherein some or all of the plurality of analog format signals are generated to fall within the first frequency band.

16. The digital server of claim 15 further comprising:
a digital converter configured to convert the digital signals in the first portion for use by one or more digital devices.

17. The digital server of claim 16 wherein:
the digital signals in the first portion represent digital contents to be used by the one or more digital devices; and
the digital signals in the second portion represent analog contents to be used by the at least one analog device.

18. The digital server of claim 15 wherein the one or more digital devices include a cable phone and a digital network.

19. The digital server of claim 15 wherein the at least one analog device includes an analog television.

20. The digital server of claim 15 wherein the plurality of digital signals include high-definition television signals.

21. The digital server of claim 15 wherein the digital-to-analog translator comprises:
a wideband receiver configured to receive the digital signals in the second portion and generate an output;
a decoder configured to decode the output from the wideband receiver and generate an output;
an encoder configured to encode the output from the decoder and generate an output;
a multiplexer configured to multiplex the output from the encoder and generate an output;
a digital-to-analog converter configured to convert the output from the multiplexer into an analog output; and
a frequency converter configured to adjust the analog output from the digital-to-analog converter to a desired frequency range.

22. The digital server of claim 21 wherein the digital-to-analog translator further includes:
a conditional access module configured to receive the output from the wideband receiver and control access to the digital signals in the second portion.

23. The digital server of claim 22 wherein the conditional access module is further configured to direct one or more digital signals in the second portion for delivery to the decoder for processing.

24. The digital server of claim 23 wherein the one or more digital signals in the second portion that are directed for delivery to the decoder are determined based on one or more criteria.

25. The digital server of claim 24 wherein the one or more criteria include a security key.

26. The digital server of claim 24 wherein the one or more criteria include subscription information.

27. The digital server of claim 15 wherein the digital channel remapping module comprises:
a frequency-down converter configured to convert the digital signals in the first portion and generate an output;
a plurality of analog-to-digital converters configured to receive the output from the frequency converter and generate an output;
a channel demultiplexer configured to receive and demultiplex the output from the plurality of analog-to-digital converters and generate an output;
a channel remapping multiplexer configured to multiplex the output from the channel demultiplexer and generate an output;
a digital-to-analog converter configured to convert the output from the channel remapping multiplexer to an analog signal; and
a frequency-up converter configured to adjust the analog signal from the digital-to-analog converter to a desired frequency range.

28. An integrated circuit incorporating the digital server of claim 15.

29. The digital server of claim 15 wherein the digital source is a cable head end.

30. A digital signal processing system comprising:
a cable head end configured to provide a plurality of digital signals, the plurality of digital signals being grouped into a first portion and a second portion, the first portion being in a first frequency band and the second portion being in a second frequency band, the digital signals in the first portion representing digital format programs and the digital signals in the second portion representing analog format programs;
a location having a plurality of analog devices located therein; and
a digital server configured to remove one or more digital signals from the first portion and remap remaining digital signals in the first portion into a plurality of digital format signals located within the first frequency band, the digital server further configured to convert at least some of the digital signals in the second portion to a plurality of analog format signals, the digital server still further configured to combine and forward the plurality of digital format signals and the plurality of analog format signals to at least one of the plurality of analog devices;
wherein some or all of the plurality of analog format signals are generated to fall within the first frequency band.

31. The digital signal processing system of claim 30 wherein the digital server includes:
a digital channel remapping module configured to remove the one or more digital signals from the first portion and remap remaining digital signals in the first portion into the first plurality of digital format signals located within the first frequency band; and
a digital-to-analog translator configured to convert the at least some of the digital signals in the second portion to the plurality of analog format signals.

32. The digital signal processing system of claim 30 wherein the digital server is further configured to convert the digital signals in the first portion for use by one or more digital devices.

33. The digital processing system of claim 32 wherein the one or more digital devices include a cable phone and a digital network.

34. The digital signal processing system of claim 30 wherein the plurality of analog devices include an analog television.

35. The digital signal processing system of claim 30 wherein the plurality of digital format signals include high-definition television signals.

36. The digital signal processing system of claim 31 wherein the digital-to-analog translator comprises:
a wideband receiver configured to receive the digital signals in the second portion and generate an output;
a decoder configured to decode the output from the wideband receiver and generate an output;
an encoder configured to encode the output from the decoder and generate an output;
a multiplexer configured to multiplex the output from the encoder and generate an output;
a digital-to-analog converter configured to convert the output from the multiplexer into an analog output; and
a frequency converter configured to adjust the analog output from the digital-to-analog converter to a desired frequency range.

37. The digital signal processing system of claim 36 wherein the digital-to-analog translator further includes:
a conditional access module configured to receive the output from the wideband receiver and control access to the digital signals in the second portion.

38. The digital signal processing system of claim 37 wherein the conditional access module is further configured to direct one or more digital signals in the second portion for delivery to the decoder for processing.

39. The digital signal processing system of claim 38 wherein the one or more digital signals in the second portion that are directed for delivery to the decoder are determined based on one or more criteria.

40. The digital signal processing system of claim 39 wherein the one or more criteria include a security key.

41. The digital signal processing system of claim 39 wherein the one or more criteria include subscription information.

42. The digital signal processing system of claim 31 wherein the digital channel remapping module comprises:
a frequency-down converter configured to convert the digital signals in the first portion and generate an output;
a plurality of analog-to-digital converters configured to receive the output from the frequency converter and generate an output;
a channel demultiplexer configured to receive and demultiplex the output from the plurality of analog-to-digital converters and generate an output;
a channel remapping multiplexer configured to multiplex the output from the channel demultiplexer and generate an output;
a digital-to-analog converter configured to convert the output from the channel remapping multiplexer to an analog signal; and
a frequency-up converter configured to adjust the analog signal from the digital-to-analog converter to a desired frequency range.

43. An integrated circuit incorporating the digital signal processing system of claim 30.

44. The system of claim 1 wherein:
the digital signals in the second portion include compressed analog contents; and
the digital-to-analog translator encodes the analog contents to NTSC format.

45. The system of claim 1 wherein:
the digital signals in the second portion include digital contents; and
the digital-to-analog translator encodes the digital contents to NTSC format.

* * * * *